(12) United States Patent
Noh et al.

(10) Patent No.: US 12,174,344 B2
(45) Date of Patent: Dec. 24, 2024

(54) SMALL LENS SYSTEM FOR TOF

(71) Applicant: SEKONIX CO., LTD., Gyeonggi-do (KR)

(72) Inventors: Ki Youn Noh, Gyeonggi-do (KR); Soon Cheol Choi, Gyeonggi-do (KR); Sung Nyun Kim, Incheon (KR); Seong Jun Bae, Gyeonggi-do (KR)

(73) Assignee: SEKONIX CO., LTD., Gyeonggi-do (KR)

( * ) Notice: Subject to any disclaimer, the term of this patent is extended or adjusted under 35 U.S.C. 154(b) by 493 days.

(21) Appl. No.: 17/505,331

(22) Filed: Oct. 19, 2021

(65) Prior Publication Data

US 2022/0128796 A1  Apr. 28, 2022

(30) Foreign Application Priority Data

Oct. 22, 2020  (KR) ........................ 10-2020-0137366

(51) Int. Cl.
 *G02B 13/18*  (2006.01)
 *G02B 9/12*  (2006.01)
 *G02B 13/00*  (2006.01)

(52) U.S. Cl.
 CPC ........... *G02B 13/0035* (2013.01); *G02B 9/12* (2013.01)

(58) Field of Classification Search
 CPC ... G02B 9/00; G02B 9/12; G02B 9/14; G02B 9/16; G02B 13/00; G02B 13/0015; G02B 13/002; G02B 13/0035; G02B 13/008; G02B 13/14; G02B 13/18; G02B 27/0025
 USPC ................ 359/716, 745, 748–749, 784–785, 359/793–794
 See application file for complete search history.

(56) References Cited

U.S. PATENT DOCUMENTS

| | | | |
|---|---|---|---|
| 7,830,622 B2 | 11/2010 | Shinohara | |
| RE42,654 E | 8/2011 | Zitting | |
| 9,116,327 B2* | 8/2015 | Ahn | ............... G02B 9/12 |
| 10,007,096 B2* | 6/2018 | Tsai | ............ G02B 13/0035 |
| 11,320,630 B2* | 5/2022 | Shobayashi | ............. G02B 9/12 |
| 2020/0244498 A1* | 7/2020 | Shin | .................. H04L 27/2613 |

* cited by examiner

*Primary Examiner* — Thong Q Nguyen
(74) *Attorney, Agent, or Firm* — Mendelsohn Dunleavy, P.C.

(57) ABSTRACT

Disclosed is a small lens system including a first lens, a second lens, and a third lens sequentially arranged from an object along an optical axis, wherein the thickness (ct1) of the first lens, the thickness (ct3) of the second lens, and the thickness (ct5) of the third lens satisfy ct1/ct3>1.5 and ct1/(ct3+ct5)>0.8, the refractive power (P2) of the second lens satisfies −0.01<P2<0.01, the lens thickness (et) at a predetermined height and the center thickness (ct) of the second lens thereof satisfy |et−ct|<5 μm up to 30% of the height of the rear effective diameter thereof and satisfy et−ct<−20 μm at 70% of the height of the rear effective diameter thereof, and the f-number of the lens system is less than 1.7.

8 Claims, 12 Drawing Sheets

PRIOR ART

PRIOR ART

SMALL LENS SYSTEM FOR TOF

CROSS REFERENCE TO RELATED APPLICATION

The present application claims priority to Korean Patent Application No. 10-2020-0137366, filed Oct. 22, 2020, the entire contents of which are incorporated herein for all purposes by this reference.

BACKGROUND OF THE INVENTION

Field of the Invention

The present invention relates to a small lens system, and more particularly to a small lens system for TOF configured such that lens sensitivity is excellent, whereby it is possible to provide accurate information, and tolerance sensitivity is alleviated, whereby the performance and productivity of lenses are improved.

Description of the Related Art

With recent increasing demand for high-quality, high-performance, miniaturized, and lightweight electronic equipment having a camera function, research to realize the same through improvement in performance of a subminiature lens optical system has been conducted.

For a small lens system mounted in such miniaturized and lightweight electronic equipment, it is advantageous to reduce the length of lenses (total track length) as much as possible due to limitation in the thickness thereof. In addition, the performance and productivity of the lenses must be excellent, and therefore the lenses must be insensitive to tolerance.

Meanwhile, a TOF (time of flight) camera having TOF technology applied thereto, which is a kind of 3D camera, has been widely used in recent years with increase in performance and function of smartphones, and has also been actively used in self-driving cars, motion recognition control, virtual reality, 3D games, etc.

TOF technology, which measures a distance based on time taken for light to return back after reflection, recognizes the three-dimensional shape of an object using an array type SPAS sensor. The core of TOF technology is to acquire depth information.

However, light may not be properly reflected or may be transmitted depending on a photographing environment or the surface texture or color of an object to be photographed. In this case, it is difficult to acquire accurate depth information.

In a lens system for TOF, therefore, a lens having a small f-number is required in order to further increase lens sensitivity.

For a lens system disclosed in U.S. Pat. No. RE42,654 E1 shown in FIG. 1A, the f-number of the lens system is 2.8, whereby lenses are slow, both the front surface and the rear surface of a second lens have small radii of curvature and high refractive powers, whereby the second lens is sensitive to tolerance, and the difference in thickness between the center and the periphery of a third lens is great, whereby the third lens is sensitive to tolerance. FIG. 1A includes reference labels Z1, D1-D8, R1-R8, G1-G3, GC, St, 10, and Simg.

For a lens system disclosed in U.S. Pat. No. 7,830,622 B1 shown in FIG. 1B, both the front surface and the rear surface of a second lens have small radii of curvature and high refractive powers, whereby the second lens is sensitive to tolerance, and the difference in thickness between the center and the periphery of a third lens is great, whereby the third lens is sensitive to tolerance. FIG. 1B includes reference labels Z1, D1-D9, R1-R9, G1-G4, St, and Simg.

As described above, the conventional technologies have problems in that the f-number is relatively large, and the lenses are sensitive to tolerance, whereby it is difficult to provide accurate 3D information about an object when being applied to a TOF camera, and the performance and productivity of the lenses are low.

SUMMARY OF THE INVENTION

The present invention has been made in view of the above problems, and it is an object of the present invention to provide a small lens system for TOF including a total of three lenses, wherein the thickness of each lens is set, the refractive power and shape of the second lens are adjusted, and an f-number is reduced, whereby lens sensitivity is excellent, and therefore it is possible to provide accurate information, and tolerance sensitivity is alleviated, whereby the performance and productivity of the lenses are improved.

In accordance with the present invention, the above and other objects can be accomplished by the provision of a small lens system for TOF including a first lens, a second lens, and a third lens sequentially arranged from an object along an optical axis, wherein the thickness (ct1) of the first lens, the thickness (ct3) of the second lens, and the thickness (ct5) of the third lens satisfy $ct1/ct3>1.5$ and $ct1/(ct3+ct5)>0.8$, the refractive power (P2) of the second lens satisfies $-0.01 \text{ mm}^{-1}<P2<0.01 \text{ mm}^{-1}$, the lens thickness (et) at a predetermined height and the center thickness (ct) of the second lens at thereof satisfy $|et-ct|<5$ μm up to 30% of the height of the rear effective diameter thereof and satisfy $et-ct<-20$ μm at 70% of the height of the rear effective diameter thereof, and the f-number of the lens system is less than 1.7.

The lens thickness (et) at the total height of the front effective diameter and the center thickness (ct) of the third lens thereof may satisfy $|et-ct|<0.2$ mm.

Each of the first lens and the third lens may have a positive refractive power.

The front surface of the first lens may be convex toward the object, and the rear surface of the first lens may be concave toward an image in the vicinity of the optical axis while being convex toward the image at the periphery thereof.

The front surface of the third lens may be convex toward the object, and the rear surface of the third lens may be concave toward the image.

All surfaces of the first lens, the second lens, and the third lens may be formed as aspherical surfaces, and each of the lenses may be made of plastic.

The front curvature (C3) and the rear curvature (C4) of the second lens may satisfy $|C3|<0.1$ and $|C4|<0.1$.

The wavelength of light used in the small lens system may range from 800 nm to 1100 nm.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention relates to a lens system including a total of three lenses, and more particularly to a small lens system for TOF configured such that a first lens, a second lens, and a third lens are sequentially arranged from an object along an optical axis and such that the tolerance of the lens system is alleviated while the lens system is small and lightweight by appropriately designing the refractive power, shape, etc. of each lens.

In addition, the present invention provides a small lens system for TOF configured such that the f-number of the lens system is set to be less than 1.7, whereby lens sensitivity is excellent, and therefore it is possible to provide accurate depth information about an object to be photographed while the performance of the lens system is excellent.

In addition, the present invention provides a small lens system for TOF configured such that the relationship in thickness of the first lens to the second lens and the third lens is set, the second lens, which is sensitive to tolerance, has a low refractive power, and the relationship between the lens thickness (et) at a predetermined height and the center thickness (ct) of the second lens thereof is set in order to alleviate tolerance sensitivity, whereby the performance and productivity of the lenses are excellent.

Figure 1A:
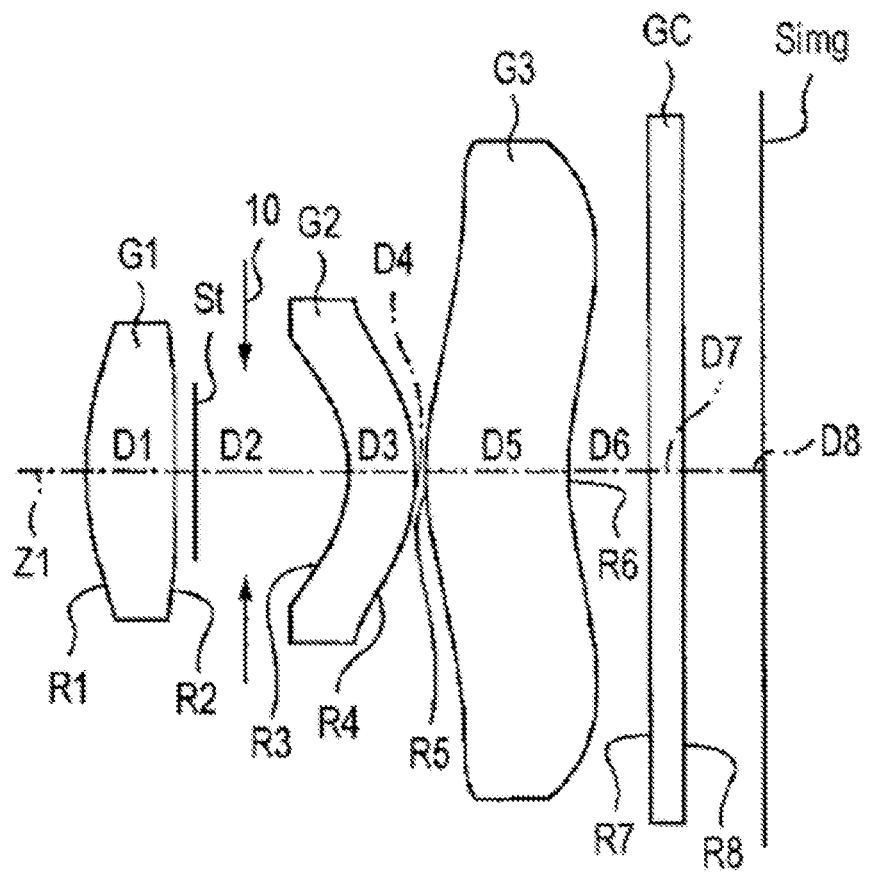
FIG. 1A and FIG. 1B are schematic views showing a conventional small lens system.
Figure 1B:
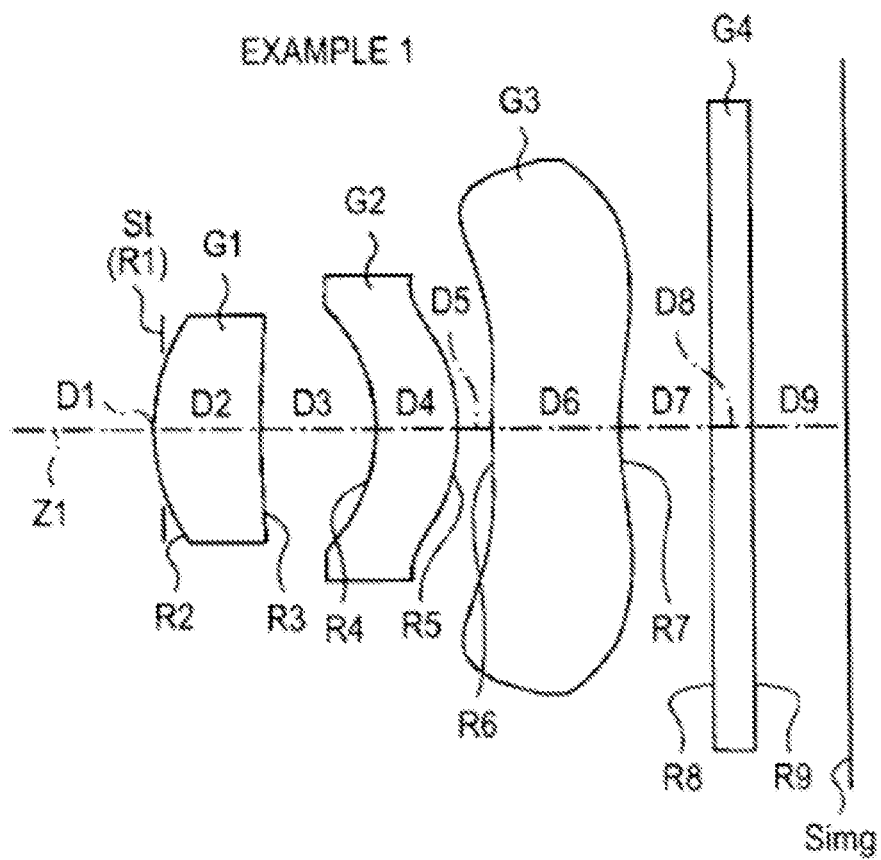
Figure 2:
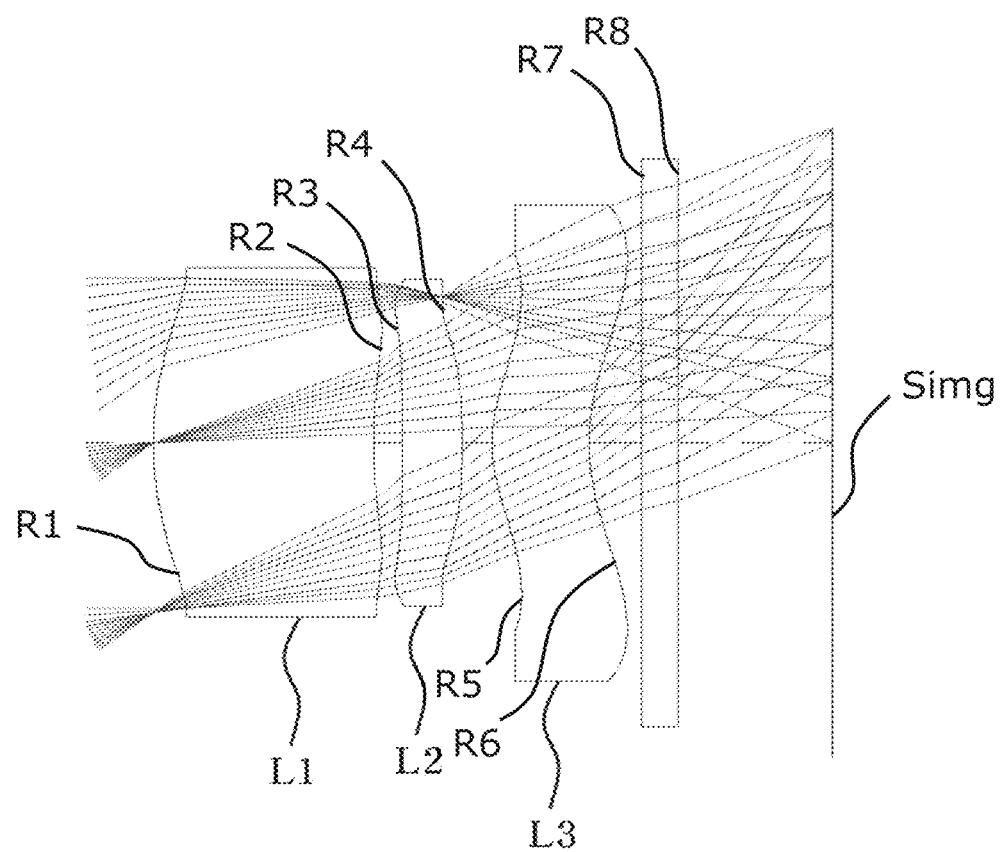
FIG. 2 is a view showing a first embodiment of a small lens system for TOF according to the present invention.
Figure 3:
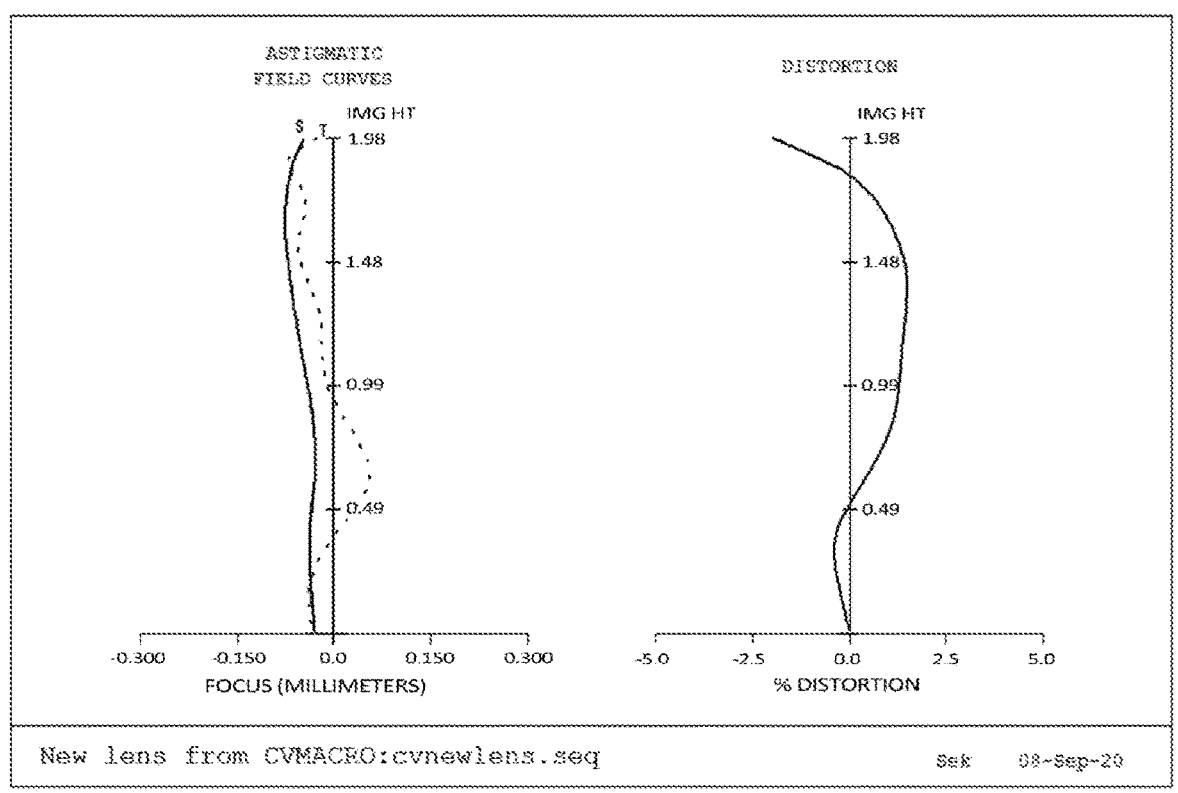
FIG. 3 is a view showing aberration according to a first embodiment of the present invention.
Figure 4:
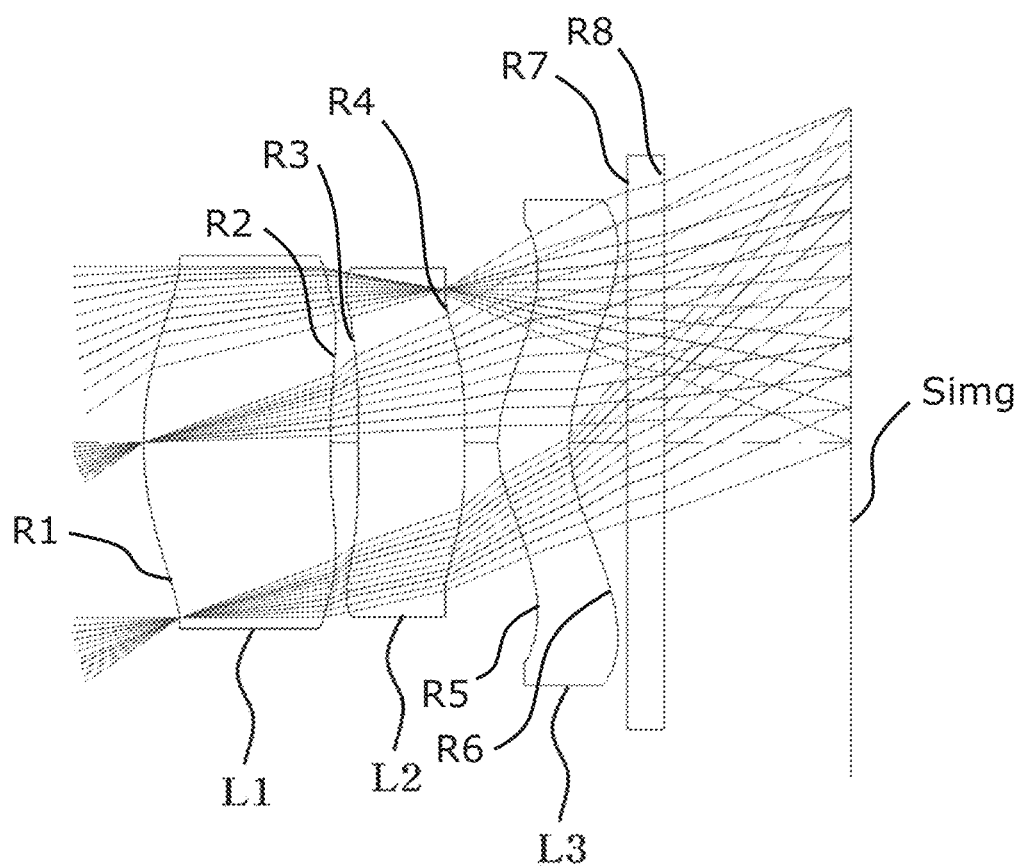
FIG. 4 is a view showing a second embodiment of the small lens system for TOF according to the present invention.
Figure 5:
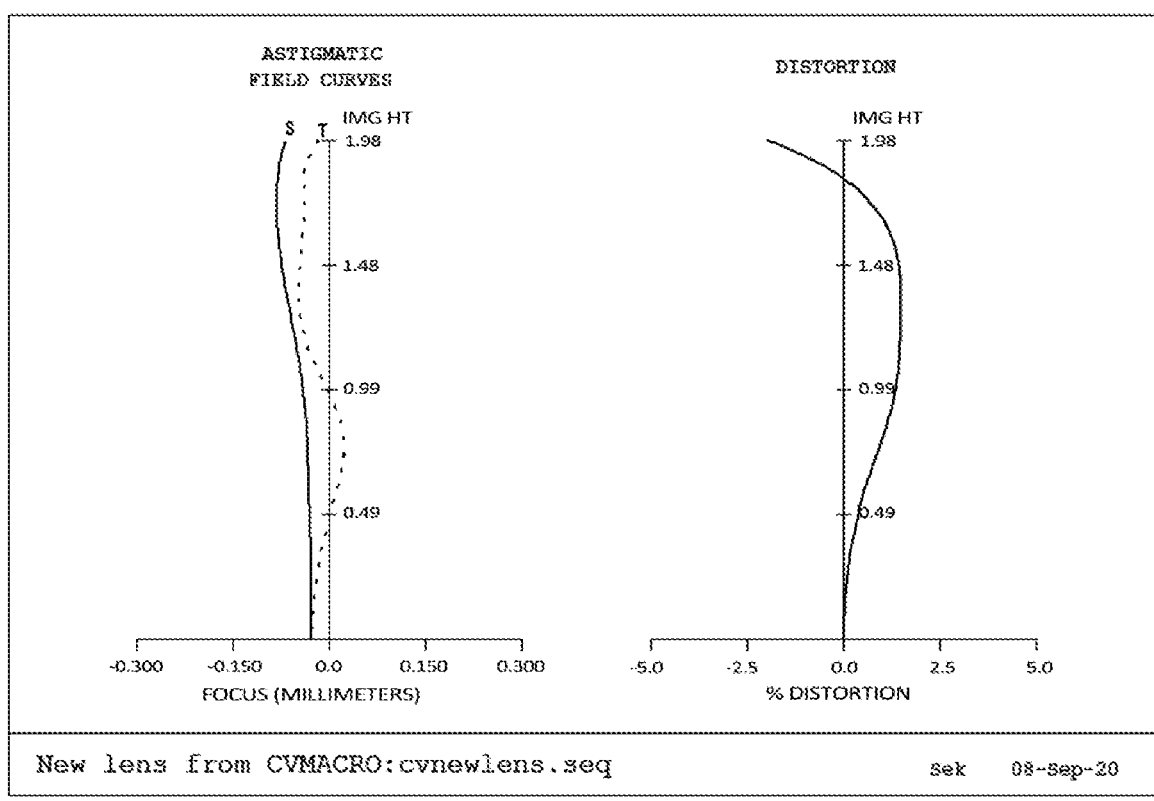
FIG. 5 is a view showing aberration according to a second embodiment of the present invention.
Figure 6:
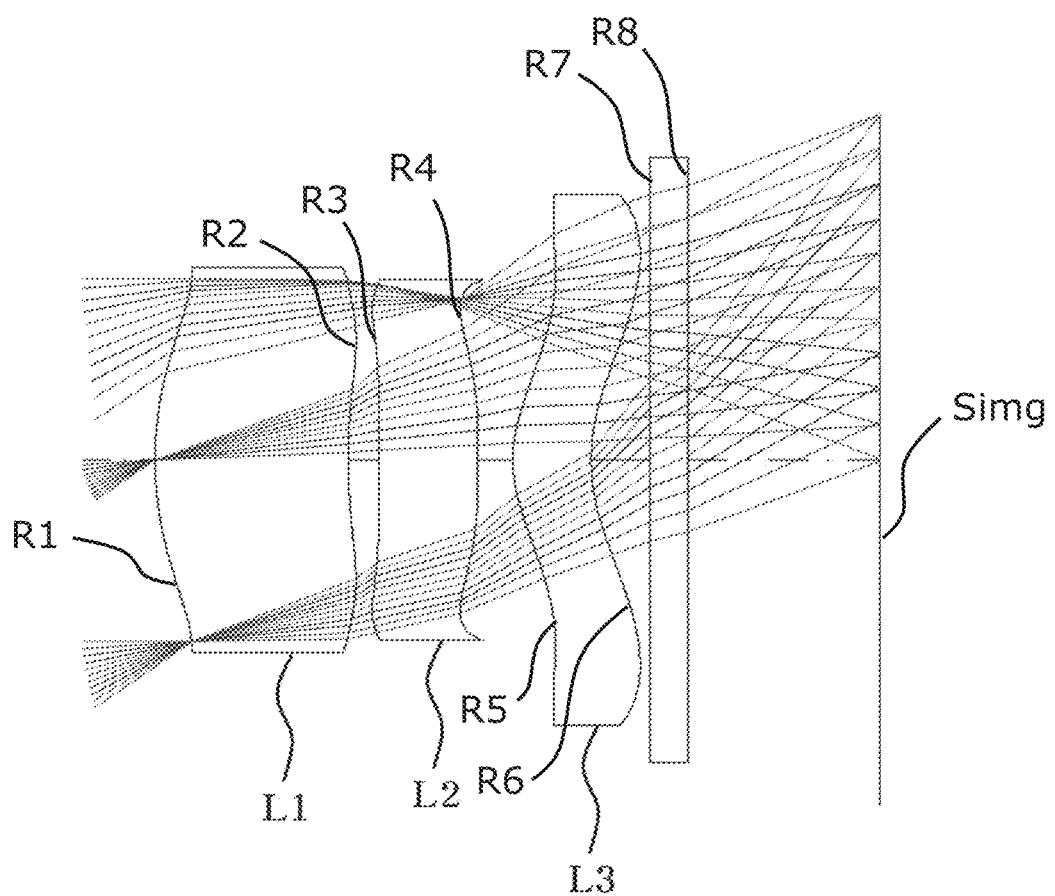
FIG. 6 is a view showing a third embodiment of the small lens system for TOF according to the present invention.
Figure 7:
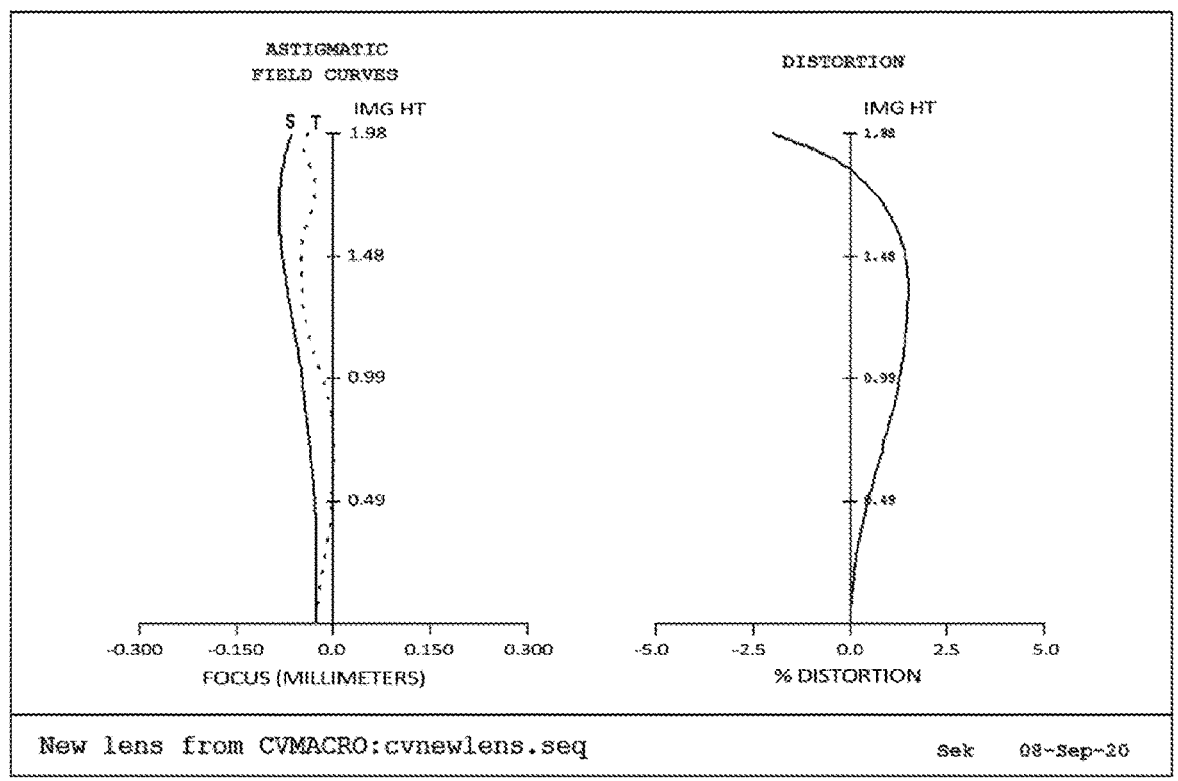
FIG. 7 is a view showing aberration according to a third embodiment of the present invention.
Figure 8:
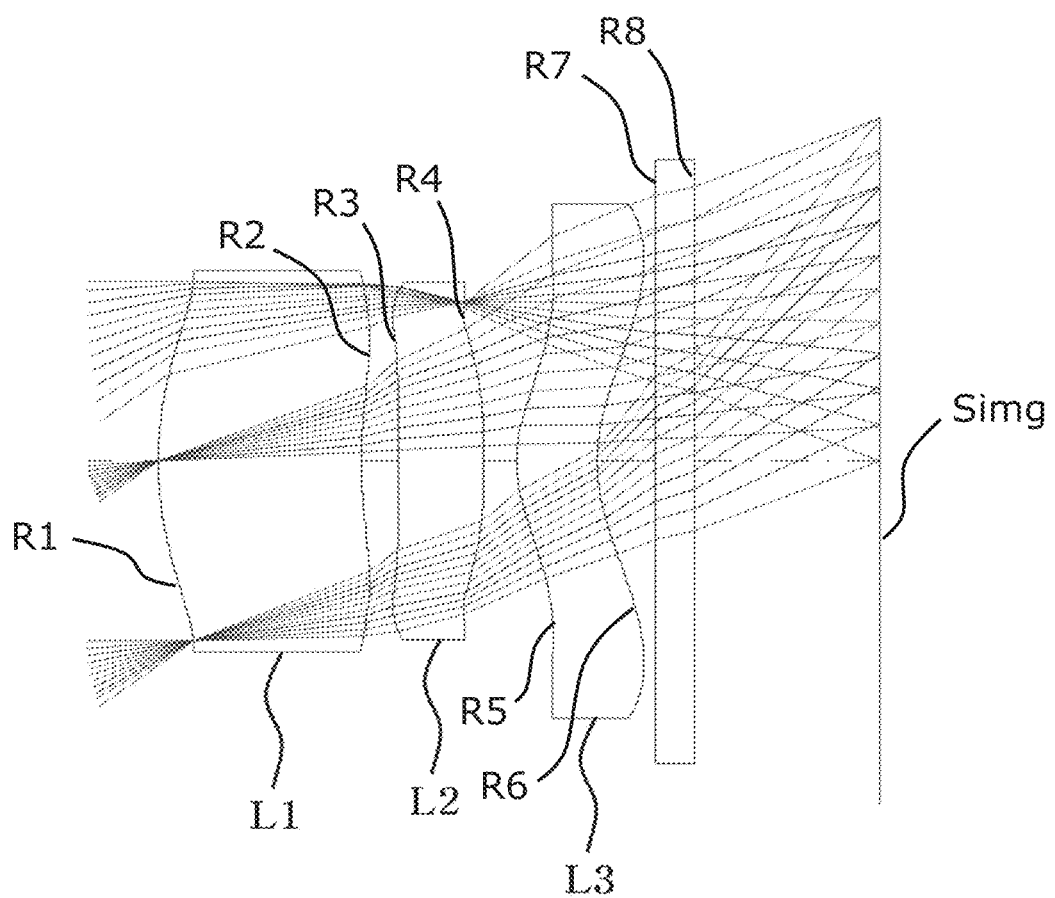
FIG. 8 is a view showing a fourth embodiment of the small lens system for TOF according to the present invention.
Figure 9:
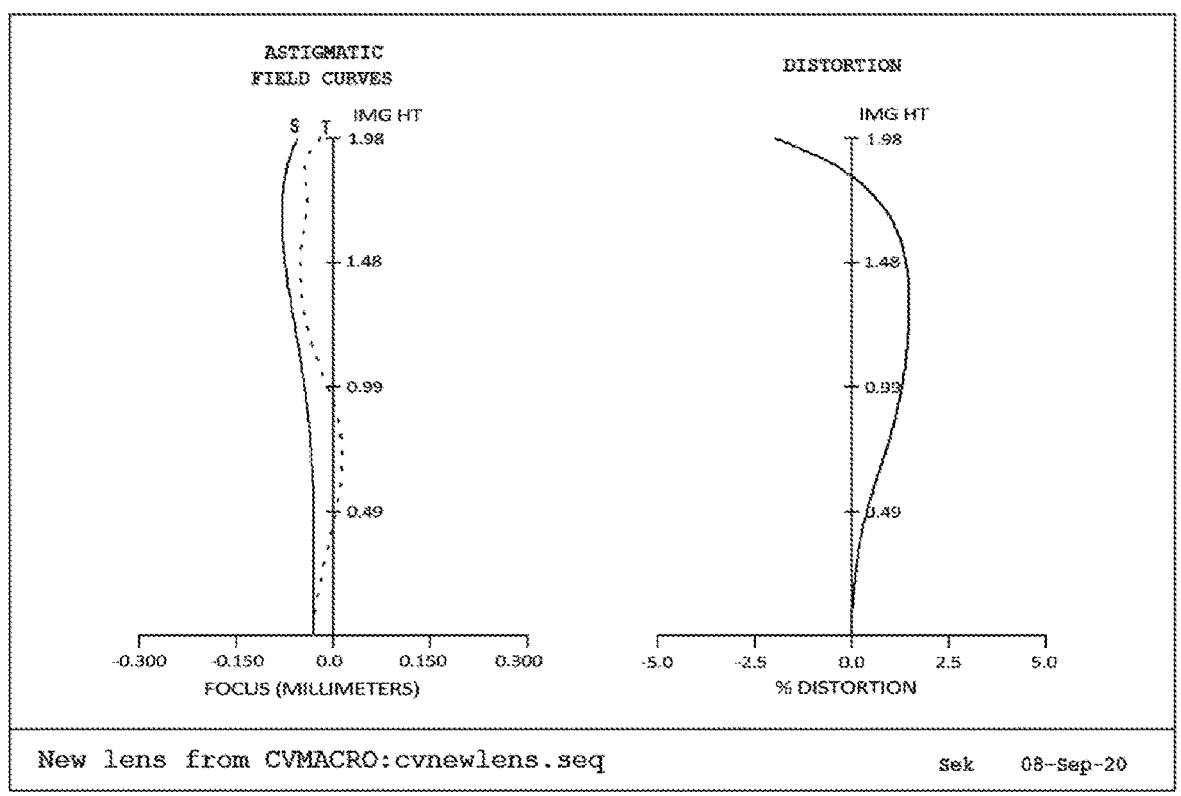
FIG. 9 is a view showing aberration according to a fourth embodiment of the present invention.
Figure 10:
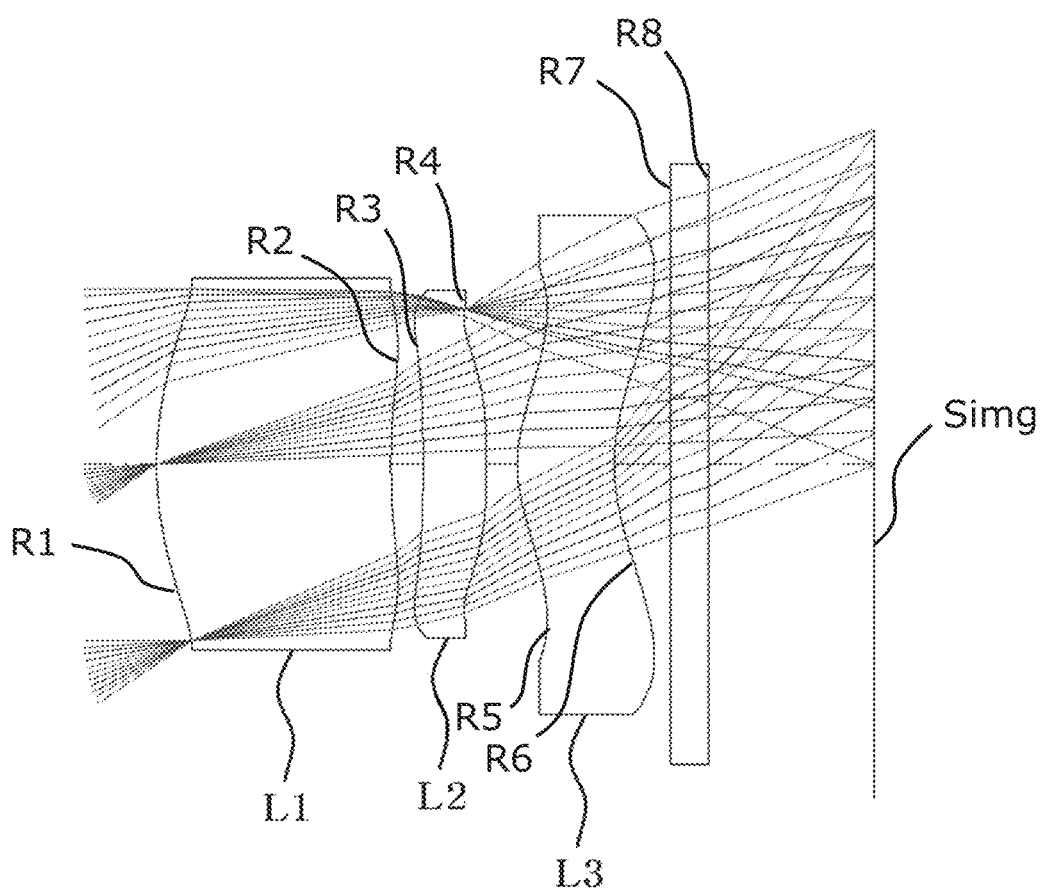
FIG. 10 is a view showing a fifth embodiment of the small lens system for TOF according to the present invention.
Figure 11:
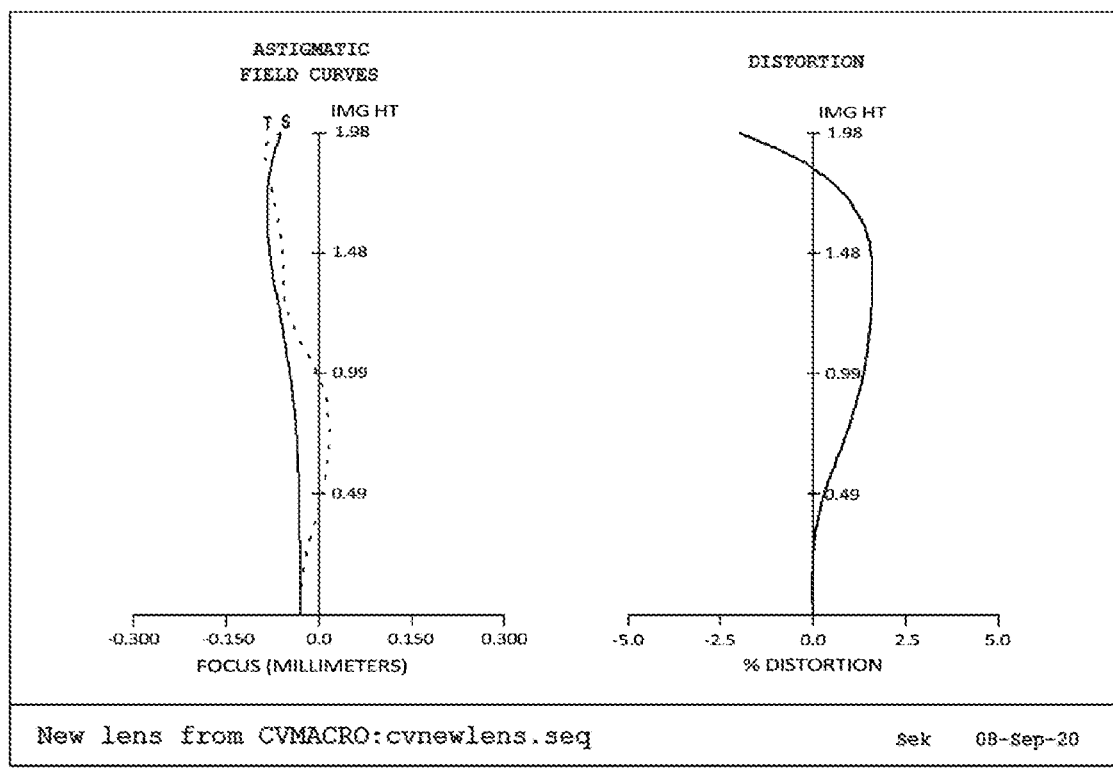
FIG. 11 is a view showing aberration according to a fifth embodiment of the present invention.

Hereinafter, the present invention will be described in detail with reference to the accompanying drawings. FIG. 2 is a view showing a first embodiment of a small lens system for TOF according to the present invention, FIG. 3 is a view showing aberration according to a first embodiment of the present invention, FIG. 4 is a view showing a second embodiment of the small lens system for TOF according to the present invention, FIG. 5 is a view showing aberration according to a second embodiment of the present invention, FIG. 6 is a view showing a third embodiment of the small lens system for TOF according to the present invention, FIG. 7 is a view showing aberration according to a third embodiment of the present invention, FIG. 8 is a view showing a fourth embodiment of the small lens system for TOF according to the present invention, FIG. 9 is a view showing aberration according to a fourth embodiment of the present invention, FIG. 10 is a view showing a fifth embodiment of the small lens system for TOF according to the present invention, and FIG. 11 is a view showing aberration according to a fifth embodiment of the present invention.

As shown, the small lens system for TOF according to the present invention includes a first lens L1, a second lens L2, and a third lens L3 sequentially disposed from an object along an optical axis, wherein the thickness ct1 of the first lens L1, the thickness ct3 of the second lens L2, and the thickness ct5 of the third lens L3 satisfy the following inequalities.

$$ct1/ct3>1.5$$

$$ct1/(ct3+ct5)>0.8$$

As defined above, the relationship in thickness of the first lens L1 to the second lens L2 and the third lens L3 is set in order to alleviate tolerance sensitivity, whereby a small lens system is provided.

The refractive power P2 of the second lens L2 satisfies the following condition.

$$-0.01\ mm^{-1}<P2<0.01\ mm^{-1}$$

As defined above, the refractive power of the second lens L2, which is sensitive to tolerance, is adjusted to be low in order to alleviate tolerance sensitivity, whereby a lens system that has excellent performance and productivity is provided.

The lens thickness et at a predetermined height and the center thickness ct of the second lens L2 thereof satisfy $|et-ct|<5\ \mu m$ up to 30% of the height of the rear effective diameter thereof and satisfy $et-ct<-20\ \mu m$ at 70% of the height of the rear effective diameter thereof.

As defined above, the relationship between the lens thickness et at a predetermined height and the center thickness ct of the second lens L2, which is sensitive to tolerance, thereof is set in order to alleviate tolerance sensitivity, whereby a small lens system for TOF that has excellent performance and productivity is provided.

That is, the refractive power, thickness, and shape of the lens system according to the present invention are set in order to reduce tolerance sensitivity and to reduce the total length of the lens system (total track length), whereby a small, lightweight lens system is provided.

The f-number of the lens system according to the present invention is set to be less than 1.7 in order to increase incident light, whereby lens sensitivity is excellent, and therefore it is possible to provide accurate depth information about an object to be photographed. As a result, a small lens system for TOF that has excellent performance is provided.

In addition, the lens thickness et at the total height of the front effective diameter and the center thickness ct of the third lens L3 thereof are set to satisfy $|et-ct|<0.2\ mm$ in order to alleviate the tolerance sensitivity of the third lens L3, whereby performance reproducibility of the lens is improved.

In addition, each of the first lens L1 and the third lens L3 is configured to have a positive refractive power, and the second lens L2 is configured to have a low refractive power, whereby a lens system that has alleviated tolerance, has a short distance, is small, and has a wide angle of view is provided.

In addition, the front surface of the first lens L1 is convex toward the object, and the rear surface of the first lens L1 is concave toward an image in the vicinity of the optical axis while being convex toward the image at the periphery thereof, whereby a small lens system is provided.

In addition, the front surface of the third lens L3 is convex toward the object, and the rear surface of the third lens L3 is concave toward the image, whereby a small lens system is provided.

In addition, all surfaces of the first lens L1, the second lens L2, and the third lens L3 are formed as aspherical surfaces, and each of the lenses is made of plastic, whereby it is possible to correct spherical aberration and chromatic aberration. Furthermore, each of the lenses is made of a material having a refractive index advantageous to reduce the length thereof, and the lenses are made of materials having Abbe numbers appropriately distributed so as to be advantageous in correcting chromatic aberration.

In addition, the front curvature C3 and the rear curvature C4 of the second lens L2 are set to satisfy |C3|<0.1 and |C4|<0.1, whereby tolerance sensitivity is minimized while a small lens system is provided.

The wavelength of light used in the small lens system for TOF according to the present invention ranges from 800 nm to 1100 nm, which is a near-infrared range. This is advantageous in acquiring depth information of an object to be photographed.

As described above, the present invention relates to a lens system including a total of three lenses, and more particularly to a lens system configured such that a first lens L1, a second lens L2, and a third lens L3 are sequentially arranged from an object along the optical axis.

As a result, a small lens system for TOF that is small, is lightweight, and has alleviated tolerance is provided.

In addition, the present invention provides a small lens system for TOF configured such that the f-number of the lens system is set to be less than 1.7, whereby lens sensitivity is excellent, and therefore it is possible to provide accurate depth information about an object to be photographed while the performance of the lens system is excellent.

In addition, the present invention provides a small lens system for TOF configured such that the relationship in thickness of the first lens L1 to the second lens L2 and the third lens L3 is set, the second lens L2, which is sensitive to tolerance, has a low refractive power, and the relationship between the lens thickness et at a predetermined height and the center thickness ct of the second lens L2 thereof is set in order to alleviate tolerance sensitivity, whereby a small lens system that has excellent performance and productivity, is small and lightweight, and has high resolution is provided.

Hereinafter, embodiments of the present invention will be described with reference to the accompanying drawings.

First Embodiment

FIG. 2 is a view showing a first embodiment of the small lens system for TOF according to the present invention.

As shown, in the first embodiment of the small lens system for TOF according to the present invention, a first lens L1, a second lens L2, and a third lens L3 are sequentially arranged from an object along an optical axis.

Table 1 below shows numerical data of the lenses constituting the lens system according to the first embodiment of the present invention.

TABLE 1

| Surface (Surface number) | RDY (Radius of curvature) | THI (Thickness) | Nd (Refractive index) | Vd (Abbe number) |
|---|---|---|---|---|
| OBJECT | INFINITY | INFINITY | | |
| STOP | 2.198 | 1.30 | 1.641 | 19.5 |
| 2 | 3.498 | 0.17 | | |
| 3 | −100.000 | 0.35 | 1.641 | 19.5 |
| 4 | −105.180 | 0.18 | | |
| 5 | 0.924 | 0.57 | 1.525 | 56.0 |
| 6 | 1.437 | 0.31 | | |
| 7 | INFINITY | 0.21 | 1.508 | 64.2 |
| 8 | INFINITY | 0.88 | | |
| IMAGE | INFINITY | 0.03 | | |

As shown in FIG. 2, the first lens L1, the second lens L2, and the third lens L3 are sequentially arranged from the object. On the assumption that an optical-axis direction is X and a direction perpendicular to the optical axis is Y, an aspherical equation is defined as expressed by Mathematical Expression 1.

$$X(Y) = \frac{\frac{Y^2}{R}}{1 + \sqrt{1 - (1+K)\left(\frac{Y}{R}\right)^2}} + A_3 Y^4 + A_4 Y^6 + A_5 Y^8 + A_6 Y^{10} + \ldots + A_{14} Y^{26}$$ [Mathematical Expression 1]

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{11}$ indicate aspherical coefficients.

The aspherical coefficients having data of the respective lenses obtained from Mathematical Expression 1 above are shown in Table 2 below.

TABLE 2

| | K | A3 | A4 | A5 | A6 | A7 | A8 | A9 | A10 | A11 |
|---|---|---|---|---|---|---|---|---|---|---|
| s1 | 1.06056 | −0.12751 | 1.07769 | −6.74626 | 24.10700 | −52.82340 | 71.71530 | −58.78760 | 26.62580 | −5.11180 |
| s2 | 5.50466 | −0.11690 | 0.41234 | −1.27312 | −1.68791 | 15.76710 | −38.84290 | 48.09890 | −29.85980 | 7.34881 |
| s3 | 99.00000 | −0.34432 | 2.30971 | −10.51320 | −64.09480 | 31.57750 | 82.52130 | −62.06290 | 24.41690 | −3.80855 |
| s4 | 99.00000 | −0.93687 | 2.78525 | −5.15005 | 1.88804 | 17.36780 | −48.09810 | 61.33190 | −39.79400 | 10.56340 |
| s5 | −3.67314 | −0.51218 | 1.41258 | −3.66993 | 6.75817 | −8.44811 | 6.86850 | −3.41072 | 0.91923 | −0.09996 |
| s6 | −26.34690 | 0.69793 | −2.23055 | 4.04211 | −4.83187 | 3.84011 | −2.00285 | 0.65746 | −0.12311 | 0.01002 |

According to the first embodiment of the present invention, an f-number is 1.4, and the wavelength of light used in the first embodiment of the present invention is 940 nm.

In addition, according to the first embodiment of the present invention, the thickness ct1 of the first lens L1, the thickness ct3 of the second lens L2, and the thickness ct5 of the third lens L3 satisfy ct1/ct3=3.71 and ct1/(ct3+ct5)=1.41, the refractive power P2 of the second lens L2 satisfies P2=−0.0003 mm$^{-1}$, and the lens thickness et at a predetermined height and the center thickness ct of the second lens L2 thereof satisfy |et−ct|=3 μm up to 30% of the height of the rear effective diameter of the second lens L2 and satisfy et−ct=−48 μm at 70% of the height of the rear effective diameter of the second lens L2.

In addition, according to the first embodiment of the present invention, the lens thickness et at the total height of the front effective diameter and the center thickness ct of the third lens L3 thereof satisfy |et−ct|=0.01 mm, the refractive power of the first lens L1 is 0.15 mm$^{-1}$, the refractive power of the third lens L3 is 0.28 mm$^{-1}$, and the front curvature C3 and the rear curvature C4 of the second lens L2 satisfy |C3|=0.01 and |C4|=0.01.

FIG. 3 is a view showing aberration according to a first embodiment of the present invention.

First data of FIG. 3 show astigmatism, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism. The astigmatism according to the first embodiment of the present invention is 0.025 mm (focus) or less, which is determined to be good.

Second data of FIG. 3 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the first embodiment of the present invention, is 2% or less, which is determined to be good.

Second Embodiment

FIG. 4 is a view showing a second embodiment of the small lens system for TOF according to the present invention.

As shown, in the second embodiment of the small lens system for TOF according to the present invention, a first lens L1, a second lens L2, and a third lens L3 are sequentially arranged from an object along an optical axis.

Table 3 below shows numerical data of the lenses constituting the lens system according to the second embodiment of the present invention.

TABLE 3

| Surface (Surface number) | RDY (Radius of curvature) | THI (Thickness) | Nd (Refractive index) | Vd (Abbe number) |
|---|---|---|---|---|
| OBJECT | INFINITY | INFINITY | | |
| STOP | 2.002 | 1.03 | 1.641 | 19.5 |
| 2 | 3.681 | 0.16 | | |
| 3 | −13.205 | 0.59 | 1.641 | 19.5 |
| 4 | −13.707 | 0.18 | | |
| 5 | 0.808 | 0.39 | 1.525 | 56.0 |
| 6 | 1.064 | 0.31 | | |
| 7 | INFINITY | 0.21 | 1.508 | 64.2 |
| 8 | INFINITY | 1.00 | | |
| IMAGE | INFINITY | 0.03 | | |

As shown in FIG. 4, the first lens L1, the second lens L2, and the third lens L3 are sequentially arranged from the object. On the assumption that an optical-axis direction is X and a direction perpendicular to the optical axis is Y, an aspherical equation is defined as expressed by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{11}$ indicate aspherical coefficients.

The aspherical coefficients having data of the respective lenses obtained from Mathematical Expression 1 above are shown in Table 4 below.

TABLE 4

| | K | A3 | A4 | A5 | A6 | A7 | A8 | A9 | A10 | A11 |
|---|---|---|---|---|---|---|---|---|---|---|
| s1 | 0.35484 | −0.12793 | 1.08072 | −6.68141 | 23.24680 | −49.43170 | 65.01430 | −51.61650 | 22.64570 | −4.21274 |
| s2 | 8.60248 | −0.22074 | 1.09242 | −6.67550 | 22.92320 | −51.56420 | 73.01130 | −61.33100 | 27.80080 | −5.23888 |
| s3 | 99.00000 | −0.25959 | 1.79832 | −9.40701 | 32.21290 | −73.30740 | 106.16600 | −91.84680 | 43.02640 | −8.38971 |
| s4 | 99.00000 | −0.77587 | 2.16169 | −3.29861 | −0.52368 | 16.18010 | −38.09840 | 44.97320 | −27.77380 | 7.12804 |
| s5 | −4.23836 | −0.12069 | −0.26629 | 0.51129 | −0.06456 | −0.88988 | 1.29295 | −0.84047 | 0.26911 | −0.03437 |
| s6 | −5.51974 | 0.35351 | −1.53039 | 2.97339 | −3.64913 | 2.95037 | −1.57261 | 0.53251 | −0.10392 | 0.00889 |

According to the second embodiment of the present invention, an f-number is 1.4, and the wavelength of light used in the second embodiment of the present invention is 940 nm.

In addition, according to the second embodiment of the present invention, the thickness ct1 of the first lens L1, the thickness ct3 of the second lens L2, and the thickness ct5 of the third lens L3 satisfy ct1/ct3=1.75 and ct1/(ct3+ct5)=1.05, the refractive power P2 of the second lens L2 satisfies P2=−0.0009 mm$^{-1}$, and the lens thickness et at a predetermined height and the center thickness ct of the second lens L2 thereof satisfy |et−ct|=3 μm up to 30% of the height of the rear effective diameter of the second lens L2 and satisfy et−ct=−36 μm at 70% of the height of the rear effective diameter of the second lens L2.

In addition, according to the second embodiment of the present invention, the lens thickness et at the total height of the front effective diameter and the center thickness ct of the third lens L3 thereof satisfy |et−ct|=0.11 mm, the refractive power of the first lens L1 is 0.18 mm$^{-1}$, the refractive power of the third lens L3 is 0.24 mm$^{-1}$, and the front curvature C3 and the rear curvature C4 of the second lens L2 satisfy |C3|=0.08 and |C4|=0.07.

FIG. 5 is a view showing aberration according to a second embodiment of the present invention.

First data of FIG. 5 show astigmatism, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism. The astigmatism according to the second embodiment of the present invention is 0.025 mm (focus) or less, which is determined to be good.

Second data of FIG. 5 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the second embodiment of the present invention, is 2% or less, which is determined to be good.

Third Embodiment

FIG. 6 is a view showing a third embodiment of the small lens system for TOF according to the present invention.

As shown, in the third embodiment of the small lens system for TOF according to the present invention, a first lens L1, a second lens L2, and a third lens L3 are sequentially arranged from an object along an optical axis.

Table 5 below shows numerical data of the lenses constituting the lens system according to the third embodiment of the present invention.

TABLE 5

| Surface (Surface number) | RDY (Radius of curvature) | THI (Thickness) | Nd (Refractive index) | Vd (Abbe number) |
|---|---|---|---|---|
| OBJECT | INFINITY | INFINITY | | |
| STOP | 1.999 | 1.04 | 1.641 | 19.5 |
| 2 | 3.100 | 0.17 | | |
| 3 | INFINITY | 0.53 | 1.641 | 19.5 |
| 4 | INFINITY | 0.19 | | |
| 5 | 0.817 | 0.42 | 1.525 | 56.0 |
| 6 | 1.167 | 0.31 | | |
| 7 | INFINITY | 0.21 | 1.508 | 64.2 |
| 8 | INFINITY | 1.00 | | |
| IMAGE | INFINITY | 0.03 | | |

As shown in FIG. 6, the first lens L1, the second lens L2, and the third lens L3 are sequentially arranged from the object. On the assumption that an optical-axis direction is X and a direction perpendicular to the optical axis is Y, an aspherical equation is defined as expressed by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{11}$ indicate aspherical coefficients.

The aspherical coefficients having data of the respective lenses obtained from Mathematical Expression 1 above are shown in Table 6 below.

TABLE 6

| | K | A3 | A4 | A5 | A6 | A7 | A8 | A9 | A10 | A11 |
|---|---|---|---|---|---|---|---|---|---|---|
| s1 | 0.30796 | −0.13013 | 1.08606 | −6.68814 | 23.24890 | −49.42780 | 65.01280 | −51.61650 | 22.64570 | −4.21274 |
| s2 | 6.07089 | −0.23147 | 1.09780 | −6.66841 | 22.91810 | −51.56950 | 73.01070 | −61.33100 | 27.80080 | −5.23888 |
| s3 | 99.00000 | −0.28474 | 1.81231 | −9.39364 | 32.21790 | −73.32200 | 106.16900 | −91.84680 | 43.02640 | −8.38971 |
| s4 | 99.00000 | −0.83099 | 2.23704 | −3.40860 | −0.43859 | 16.18000 | −38.09840 | 44.97320 | −27.77390 | 7.12804 |
| s5 | −4.46724 | −0.07364 | −0.30911 | 0.51838 | −0.05653 | −0.88786 | 1.29155 | −0.84163 | 0.26973 | −0.03436 |
| s6 | −6.67719 | 0.41176 | −1.58426 | 2.99054 | −3.64585 | 2.94862 | −1.57288 | 0.53256 | −0.10391 | 0.00891 |

According to the third embodiment of the present invention, an f-number is 1.4, and the wavelength of light used in the third embodiment of the present invention is 940 nm.

In addition, according to the third embodiment of the present invention, the thickness ct1 of the first lens L1, the thickness ct3 of the second lens L2, and the thickness ct5 of the third lens L3 satisfy ct1/ct3=1.96 and ct1/(ct3+ct5)=1.1, the refractive power P2 of the second lens L2 satisfies P2=0 mm$^{-1}$, and the lens thickness et at a predetermined height and the center thickness ct of the second lens L2 thereof satisfy |et−ct|=3 μm up to 30% of the height of the rear effective diameter of the second lens L2 and satisfy et−ct=−40 μm at 70% of the height of the rear effective diameter of the second lens L2.

In addition, according to the third embodiment of the present invention, the lens thickness et at the total height of the front effective diameter and the center thickness ct of the third lens L3 thereof satisfy |et−ct|=0.03 mm, the refractive power of the first lens L1 is 0.16 mm$^{-1}$, the refractive power of the third lens L3 is 0.27 mm$^{-1}$, and the front curvature C3 and the rear curvature C4 of the second lens L2 satisfy |C3|=0 and |C4|=0.

FIG. 7 is a view showing aberration according to a third embodiment of the present invention.

First data of FIG. 7 show astigmatism, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism. The astigmatism according to the third embodiment of the present invention is 0.025 mm (focus) or less, which is determined to be good.

Second data of FIG. 7 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the third embodiment of the present invention, is 2% or less, which is determined to be good.

Fourth Embodiment

FIG. 8 is a view showing a fourth embodiment of the small lens system for TOF according to the present invention.

As shown, in the fourth embodiment of the small lens system for TOF according to the present invention, a first lens L1, a second lens L2, and a third lens L3 are sequentially arranged from an object along an optical axis.

Table 7 below shows numerical data of the lenses constituting the lens system according to the fourth embodiment of the present invention.

TABLE 7

| Surface (Surface number) | RDY (Radius of curvature) | THI (Thickness) | Nd (Refractive index) | Vd (Abbe number) |
|---|---|---|---|---|
| OBJECT | INFINITY | INFINITY | | |
| STOP | 2.079 | 1.10 | 1.641 | 19.5 |
| 2 | 3.228 | 0.20 | | |
| 3 | 54.039 | 0.46 | 1.641 | 19.5 |
| 4 | 296.106 | 0.18 | | |
| 5 | 0.819 | 0.44 | 1.525 | 56.0 |
| 6 | 1.148 | 0.31 | | |
| 7 | INFINITY | 0.21 | 1.508 | 64.2 |
| 8 | INFINITY | 0.98 | | |
| IMAGE | INFINITY | 0.03 | | |

As shown in FIG. 8, the first lens L1, the second lens L2, and the third lens L3 are sequentially arranged from the object. On the assumption that an optical-axis direction is X and a direction perpendicular to the optical axis is Y, an aspherical equation is defined as expressed by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, ..., and $A_{11}$ indicate aspherical coefficients.

The aspherical coefficients having data of the respective lenses obtained from Mathematical Expression 1 above are shown in Table 8 below.

According to the fourth embodiment of the present invention, an f-number is 1.4, and the wavelength of light used in the fourth embodiment of the present invention is 940 nm.

In addition, according to the fourth embodiment of the present invention, the thickness ct1 of the first lens L1, the thickness ct3 of the second lens L2, and the thickness ct5 of the third lens L3 satisfy ct1/ct3=2.39 and ct1/(ct3+ct5)=1.22, the refractive power P2 of the second lens L2 satisfies P2=−0.0003 mm$^{-1}$, and the lens thickness et at a predetermined height and the center thickness ct of the second lens L2 thereof satisfy |et−ct|=1 μm up to 30% of the height of the rear effective diameter of the second lens L2 and satisfy et−ct=−49 μm at 70% of the height of the rear effective diameter of the second lens L2.

In addition, according to the fourth embodiment of the present invention, the lens thickness et at the total height of the front effective diameter and the center thickness ct of the third lens L3 thereof satisfy |et−ct|=0.05 mm, the refractive power of the first lens L1 is 0.15 mm$^{-1}$, the refractive power of the third lens L3 is 0.27 mm$^{-1}$, and the front curvature C3 and the rear curvature C4 of the second lens L2 satisfy |C3|=0.02 and |C4|=0.003.

FIG. 9 is a view showing aberration according to a fourth embodiment of the present invention.

First data of FIG. 9 show astigmatism, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism. The astigmatism according to the fourth embodiment of the present invention is 0.025 mm (focus) or less, which is determined to be good.

Second data of FIG. 9 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the fourth embodiment of the present invention, is 2% or less, which is determined to be good.

Fifth Embodiment

FIG. 10 is a view showing a fifth embodiment of the small lens system for TOF according to the present invention.

As shown, in the fifth embodiment of the small lens system for TOF according to the present invention, a first lens L1, a second lens L2, and a third lens L3 are sequentially arranged from an object along an optical axis.

Table 9 below shows numerical data of the lenses constituting the lens system according to the fifth embodiment of the present invention.

TABLE 8

| | K | A3 | A4 | A5 | A6 | A7 | A8 | A9 | A10 | A11 |
|---|---|---|---|---|---|---|---|---|---|---|
| s1 | 0.15253 | −0.11917 | 0.99569 | −6.09757 | 21.05990 | −44.45880 | 58.04940 | −45.73230 | 19.90110 | −3.67085 |
| s2 | 4.95267 | −0.17022 | 0.52937 | −3.12037 | 10.05180 | −22.62490 | 33.02580 | −28.49360 | 13.10570 | −2.47836 |
| s3 | 99.00000 | −0.30363 | 1.69869 | −8.16017 | 26.75350 | −60.01720 | 87.59280 | −76.92210 | 36.58730 | −7.23018 |
| s4 | 99.00000 | −0.94271 | 2.52199 | −3.18689 | −5.99465 | 38.74680 | −85.66320 | 101.65000 | −63.72560 | 16.56850 |
| s5 | −3.59614 | −0.38647 | 0.65309 | −1.59769 | 3.18388 | −4.23800 | 3.58574 | −1.84234 | 0.52268 | −0.06265 |
| s6 | −6.23702 | 0.32665 | −1.36214 | 2.59088 | −3.15832 | 2.56428 | −1.38217 | 0.47544 | −0.09455 | 0.00827 |

TABLE 9

| Surface (Surface number) | RDY (Radius of curvature) | THI (Thickness) | Nd (Refractive index) | Vd (Abbe number) |
|---|---|---|---|---|
| OBJECT | INFINITY | INFINITY | | |
| STOP | 2.185 | 1.30 | 1.641 | 19.5 |
| 2 | 3.780 | 0.18 | | |
| 3 | −14.629 | 0.35 | 1.641 | 19.5 |
| 4 | −14.607 | 0.17 | | |
| 5 | 0.904 | 0.54 | 1.525 | 56.0 |
| 6 | 1.309 | 0.31 | | |

TABLE 9-continued

| Surface (Surface number) | RDY (Radius of curvature) | THI (Thickness) | Nd (Refractive index) | Vd (Abbe number) |
|---|---|---|---|---|
| 7 | INFINITY | 0.21 | 1.508 | 64.2 |
| 8 | INFINITY | 0.89 | | |
| IMAGE | INFINITY | 0.03 | | |

As shown in FIG. 10, the first lens L1, the second lens L2, and the third lens L3 are sequentially arranged from the object. On the assumption that an optical-axis direction is X and a direction perpendicular to the optical axis is Y, an aspherical equation is defined as expressed by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{11}$ indicate aspherical coefficients.

The aspherical coefficients having data of the respective lenses obtained from Mathematical Expression 1 above are shown in Table 10 below.

TABLE 10

| | K | A3 | A4 | A5 | A6 | A7 | A8 | A9 | A10 | A11 |
|---|---|---|---|---|---|---|---|---|---|---|
| s1 | 0.89292 | −0.14416 | 1.22412 | −7.26261 | 24.86060 | −52.68540 | 69.71860 | −56.01970 | 24.96850 | −4.73068 |
| s2 | 6.08065 | −0.16002 | 0.67706 | −3.03636 | 6.41142 | −6.95928 | 0.41676 | 7.93293 | −7.78370 | 2.35119 |
| s3 | 99.00000 | −0.25630 | 1.12034 | −3.16783 | 6.27328 | −11.09500 | 15.67390 | −13.10260 | 5.39975 | −0.81140 |
| s4 | 99.00000 | −0.95027 | 2.84742 | −5.12444 | 1.85364 | 17.36780 | −48.09810 | 61.33190 | −39.79400 | 10.56340 |
| s5 | −4.00710 | −0.57629 | 1.79281 | −5.26837 | 11.17510 | −16.11540 | 15.14070 | −8.79099 | 2.84415 | −0.38974 |
| s6 | −12.62810 | 0.39350 | −1.26383 | 2.09907 | −2.25944 | 1.59068 | −0.72349 | 0.20354 | −0.03210 | 0.00216 |

According to the fifth embodiment of the present invention, an f-number is 1.4, and the wavelength of light used in the fifth embodiment of the present invention is 940 nm.

In addition, according to the fifth embodiment of the present invention, the thickness ct1 of the first lens L1, the thickness ct3 of the second lens L2, and the thickness ct5 of the third lens L3 satisfy ct1/ct3=3.71 and ct1/(ct3+ct5)=1.46, the refractive power P2 of the second lens L2 satisfies P2=−0.0004 mm$^{-1}$, and the lens thickness et at a predetermined height and the center thickness ct of the second lens L2 thereof satisfy |et−ct|=3 μm up to 30% of the height of the rear effective diameter of the second lens L2 and satisfy et−ct=−48 μm at 70% of the height of the rear effective diameter of the second lens L2.

In addition, according to the fifth embodiment of the present invention, the lens thickness et at the total height of the front effective diameter and the center thickness ct of the third lens L3 thereof satisfy |et−ct|=0.13 mm, the refractive power of the first lens L1 is 0.16 mm$^{-1}$, the refractive power of the third lens L3 is 0.26 mm$^{-1}$, and the front curvature C3 and the rear curvature C4 of the second lens L2 satisfy |C3|=0.07 and |C4|=0.07.

FIG. 11 is a view showing aberration according to a fifth embodiment of the present invention.

First data of FIG. 11 show astigmatism, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism. The astigmatism according to the fifth embodiment of the present invention is 0.025 mm (focus) or less, which is determined to be good.

Second data of FIG. 11 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the fifth embodiment of the present invention, is 2% or less, which is determined to be good.

As is apparent from the above description, the present invention has an effect of providing a lens system including a first lens, a second lens, and a third lens sequentially arranged from an object along an optical axis, particularly a small lens system for TOF configured such that the tolerance of the lens system is alleviated while the lens system is small and lightweight by appropriately designing the refractive power, shape, etc. of each lens.

In addition, the present invention provides a small lens system for TOF configured such that the f-number of the lens system is set to be less than 1.7, whereby lens sensitivity is excellent, and therefore it is possible to provide accurate depth information about an object to be photographed while the performance of the lens system is excellent.

In particular, the present invention provides a small lens system for TOF configured such that the relationship in thickness of the first lens to the second lens and the third lens is set, the second lens, which is sensitive to tolerance, has a low refractive power, and the relationship between the lens thickness (et) at a predetermined height and the center thickness (ct) of the second lens thereof is set in order to alleviate tolerance sensitivity, whereby the performance and productivity of the lenses are excellent.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A small lens system for time of flight (TOF) comprising a first lens, a second lens, and a third lens sequentially arranged from an object along an optical axis, wherein a center thickness (ct1) of the first lens, a center thickness (ct3) of the second lens, and a center thickness (ct5) of the third lens satisfy ct1/ct3 >1.5 and ct1/(ct3+ct5) >0.8, a refractive power (P2) of the second lens satisfies −0.01 mm$^{-1}$<P2<0.01 mm$^{-1}$, a lens thickness (et3) at a predetermined height and the center thickness (ct3) of the second lens thereof satisfy |et3−ct3|<5 m up to 30% of a height of a rear effective diameter thereof and satisfy et3−ct3<−20 μm at 70% of the height of the rear effective diameter thereof, and an f-number of the lens system is less than 1.7.

2. The small lens system according to claim 1, wherein a lens thickness (et5) at a total height of a front effective diameter and the center thickness (ct5) of the third lens thereof satisfy |et5−ct5|<0.2 mm.

3. The small lens system according to claim 1, wherein each of the first lens and the third lens has a positive refractive power.

4. The small lens system according to claim 1, wherein
a front surface of the first lens is convex toward the object, and
a rear surface of the first lens is concave toward an image in a vicinity of the optical axis while being convex toward the image at a periphery thereof.

5. The small lens system according to claim 1, wherein
a front surface of the third lens is convex toward the object, and
a rear surface of the third lens is concave toward an image.

6. The small lens system according to claim 1, wherein
all surfaces of the first lens, the second lens, and the third lens are formed as aspherical surfaces, and
each of the lenses is made of plastic.

7. The small lens system according to claim 1, wherein a front curvature (C3) and a rear curvature (C4) of the second lens satisfy |C3|<0.1 and |C4|<0.1.

8. The small lens system according to claim 1, wherein a wavelength of light used in the small lens system ranges from 800 nm to 1100 nm.

* * * * *